(12) United States Patent
Carraway et al.

(10) Patent No.: US 11,385,871 B2
(45) Date of Patent: Jul. 12, 2022

(54) ADJUSTING A USER INTERFACE LAYOUT BASED ON USER USAGE PATTERNS

(71) Applicant: salesforce.com, inc., San Francisco, CA (US)

(72) Inventors: Stephen Carraway, Durham, NC (US); Matthew Buland, Apex, NC (US); Michael Burr, Cary, NC (US)

(73) Assignee: salesforce, inc., San Francisco, CA (US)

( * ) Notice: Subject to any disclaimer, the term of this patent is extended or adjusted under 35 U.S.C. 154(b) by 0 days.

(21) Appl. No.: 16/864,917

(22) Filed: May 1, 2020

(65) Prior Publication Data
US 2021/0342128 A1 Nov. 4, 2021

(51) Int. Cl.
*G06F 11/34* (2006.01)
*G06F 8/38* (2018.01)
*G06N 20/00* (2019.01)
*G06F 9/451* (2018.01)

(52) U.S. Cl.
CPC ............... *G06F 8/38* (2013.01); *G06F 9/451* (2018.02); *G06F 11/3438* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,713,068 B1* | 7/2020 | Zohar | G06F 8/38 |
| 10,726,095 B1* | 7/2020 | Pallemulle | G06F 16/9535 |
| 2018/0018307 A1* | 1/2018 | Wu | G06F 3/0484 |
| 2019/0332176 A1* | 10/2019 | Yang | G06F 3/016 |
| 2020/0119979 A1* | 4/2020 | Woodland | G06F 8/658 |

* cited by examiner

*Primary Examiner* — Di Xiao
(74) *Attorney, Agent, or Firm* — Holland & Hart LLP

(57) ABSTRACT

Methods, systems, and devices supporting adjusting user interfaces based on user usage patterns are described. A page layout server may store an initial page layout for a page corresponding to a data object type, where the initial page layout may be defined by a first user and include a set of user interface components. The page layout server may transmit, to a set of user devices, a first indication of the page for display by the set of user devices according to the initial page layout. The page layout server may track user interactions with the set of user interface components, determine an updated page layout for the page based on an analysis of the tracked user interactions and the initial page layout, and transmit a second indication of the page for display by the set of user devices according to the updated page layout.

20 Claims, 11 Drawing Sheets

ADJUSTING A USER INTERFACE LAYOUT BASED ON USER USAGE PATTERNS

FIELD OF TECHNOLOGY

The present disclosure relates generally to database systems and data processing, and more specifically to adjusting a user interface layout based on user usage patterns.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms—or other systems—may allow a user to update page layouts defining how data is displayed in a user interface to users. Generating an updated page layout may involve manually building a page layout. A page that is manually built may fail to present information relevant to a user, present unrelated or unhelpful information to the user, reduce the user's efficiency, or any combination thereof. For example, the user building the page layout may not fully understand use cases for the page across all users utilizing the page layout. As such, some updated page layouts may additional or alternatively degrade user experience. For example, an updated page layout may introduce latency into a user accessing particular data or accomplishing particular tasks, degrading user experience and reducing system efficiency.

DETAILED DESCRIPTION

Figure 1:
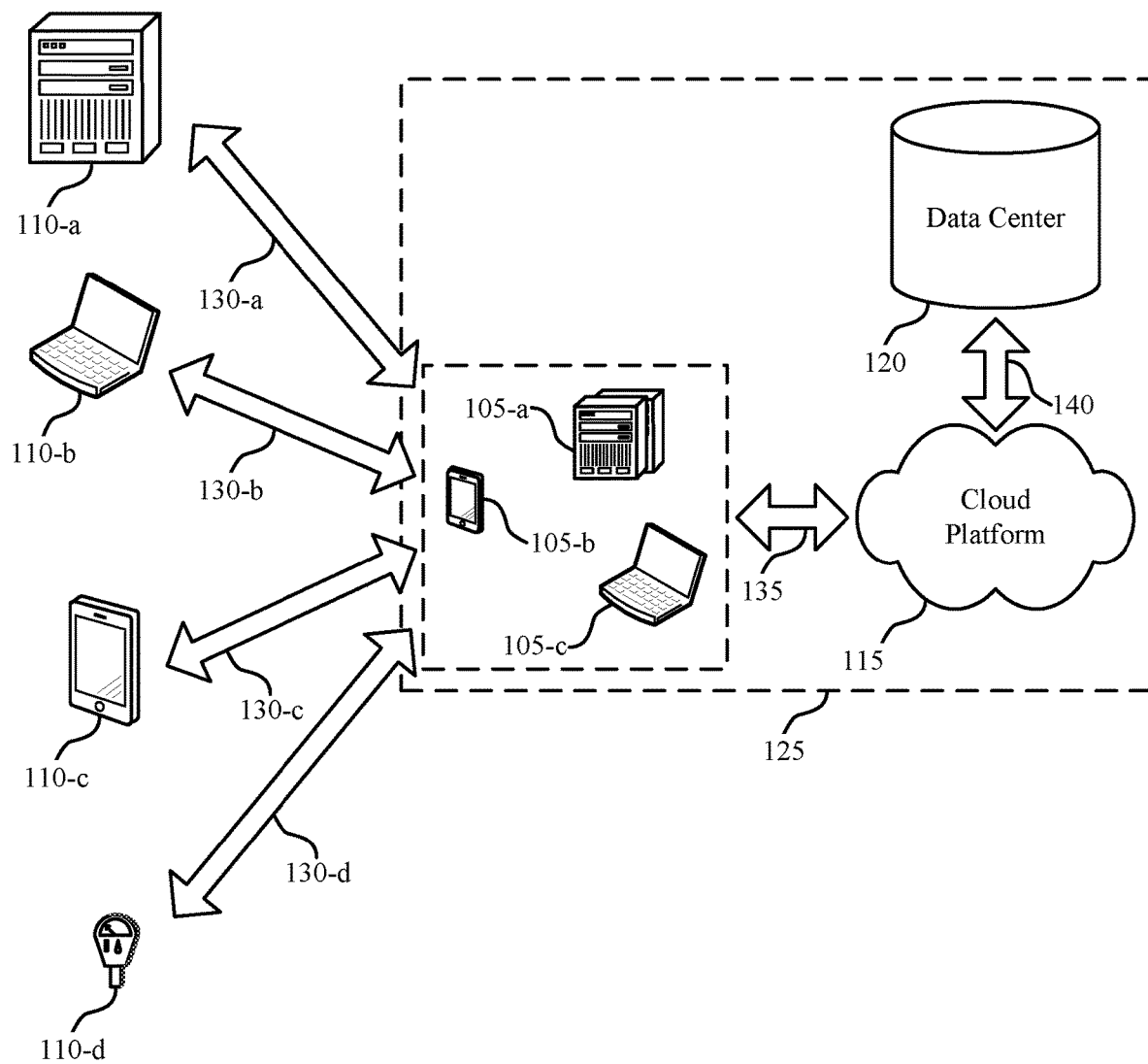
FIG. 1 illustrates an example of a system for data processing that supports adjusting a user interface layout based on user usage patterns in accordance with aspects of the present disclosure.

Some systems (e.g., cloud platforms or other systems) may support page layouts to display information related to a data object stored in a database. A page layout may allow a user to view the information in a user interface and navigate to related information (e.g., drill down to more detailed data, view information for related data objects, etc.) by clicking on specific user interface components in the page layout. In some examples, a system may support adjusting page layouts to improve user experience and efficiency. An updated page layout may be generated for a user or user group, and the updated page layout may increase the efficiency of the user or user group. In some cases, generating an updated page layout may involve a user manually building a page layout based on the user's understanding of how the page is to be used. In some examples, an updated page layout may fail to present information associated with a user or reduce the efficiency of the user. For example, an updated page layout may be defined by an administrative user but may also be used by a sales user, and the updated page layout may fail to effectively present information corresponding to sales leads, which may result in additional steps (e.g., additional scrolling, additional clicks, etc.) in order for the sales user to access useful information associated with sales leads. In some additional or alternative examples, information corresponding to user permissions may be contained in a collapsed page component, which may increase the administrative user's mouse clicks and reduce the administrative user's efficiency in accessing this information.

A page layout updating system may adjust a page layout or user interface based on page usage patterns. Adjusting a user interface based on page usage patterns may provide a user experience that is tailored to a user role and/or past user interface interactions, thereby improving user experience and efficiency. A server (e.g., a page layout server) may store an initial page layout for a page (e.g., a user interface associated with a uniform resource locator (URL) route, a user interface associated with a set of components, etc.) in a database (e.g., a page layout data store). The initial page layout may be a default page layout and/or designed by an administrative user. In some cases, an initial page layout may be designed for a user role (e.g., a user group), while in some additional or alternative cases, a default page layout may be used for one or more user roles. The initial page layout may include a set of user interface components, and the page layout server may transmit the initial page layout to one or more user devices. In some cases, the one or more user devices may be associated with users corresponding to a single user role (e.g., an administrative user) or a number or user roles (e.g., an administrative user, a sales user, and a human resources user, among other potential user roles). The page layout server may track user interactions with the set of user interface components. For example, the page layout server may track mouse clicks associated with the set of user interface components, the time spent per page, the time to task completion (e.g., the time taken to register a new user, the time taken to respond to a customer question, etc.), or any combination thereof. In some cases, the tracked user interactions may be used to analyze and alter the page layout, thereby improving user experience and efficiency.

For example, the page layout server may determine an updated page layout for the page based on an analysis of the tracked user interactions and the initial page layout, and the page layout server may suggest an updated page layout based on the user interactions. In some examples, as part of determining the updated page layout, the page layout server may employ a number of data mining and/or machine learning techniques based on the user interaction data. In some cases, the page layout server may determine user groups corresponding to users with similar roles or similar habits (e.g., similar historical interactions with a page) and may determine different updated page layouts for different groups. The page layout server may transmit an updated page layout to one or more user devices based on the user interaction data for these user devices. For example, the user interaction data may be associated with users of a particular role, and the updated page layout may be transmitted to users who are associated with the particular role. In some additional or alternative cases, the updated page layout may be suggested to users who are associated with generic or alternative roles. In some cases, the page layout server may automatically update a page layout to improve user efficiency and user experience. In some other cases, the page layout server may push the updated page layout based on one more triggers (e.g., a user selecting to try an updated page layout, an update schedule, etc.).

Aspects of the disclosure are initially described in the context of an environment supporting an on-demand database service. Aspects of the disclosure are further described with respect to a page layout updating system, a page layout deployment system, a user device, and a process flow. Aspects of the disclosure are further illustrated by and described with reference to apparatus diagrams, system diagrams, and flowcharts that relate to adjusting a user interface layout based on user usage patterns.

FIG. 1 illustrates an example of a system 100 for data processing that supports adjusting a user interface layout based on user usage patterns in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and the cloud client 105 may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may include multiple databases, servers, or other types of systems. For example, the data center 120 or cloud platform 115 may include a page layout server and/or a page layout data store. In some cases, the page layout server may support adjusting a user interface layout based on user usage patterns. The cloud platform 115 or an application server of subsystem 125 may store an initial page layout locally and/or in the data center 120. The page layout server may transmit a first indication of the page for display to a set of cloud clients 105 or contacts 110. The page layout server may additionally track user interactions with a set of user interface components, determine an updated page layout, and transmit a second indication of the page for display to the set of cloud clients 105 or contacts 110.

In some other systems, a user may manually build a page layout for a number of users. If the user does not have a complete understanding of how each user operates and interacts with the page, the page layouts may increase system latency and reduce user efficiency for at least a subset of users. For example, a user device may retrieve data associated with user interface components for display to a user, even if the user interface components are not relevant to that particular user. In some additional or alternative examples, a user may regularly navigate several pages to view or otherwise interact with a user interface component. Navigating multiple pages may involve additional user inputs (e.g., entering user credentials, clicking a mouse, etc.) which may reduce user efficiency.

In contrast, the system 100 may support adjusting a user interface layout based on user usage patterns. For example, a page layout server of subsystem 125 may analyze user interactions associated with an initial page layout, determine an updated page layout based on analyzing the user interactions, and transmit the updated page layout to one or more user devices. In some examples, the updated page layout may be based on the initial page layout and the user interactions, and the updated page layout may be optimized to reduce system latency and improve user efficiency. Based on an updated page layout, a user interface may display an optimized or otherwise customized user interface for a user, a group of users, or a user type, thereby improving user experience and user efficiency.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms may request or be provided with an updated page layout to reduce system latency, improve user efficiency, improve user experience, or some combination thereof. For example, an initial page layout may include extraneous components or data, and the user may navigate multiple pages or components to locate relevant data. In some cases, the user may navigate the multiple pages on a regular basis, which may degrade user efficiency. A system supporting the adjustment of a user interface layout based on user usage patterns may provide an updated page layout for particular users, user groups, or user roles, thereby improving user efficiency, reducing system latency, and improving user experience.

Figure 2:
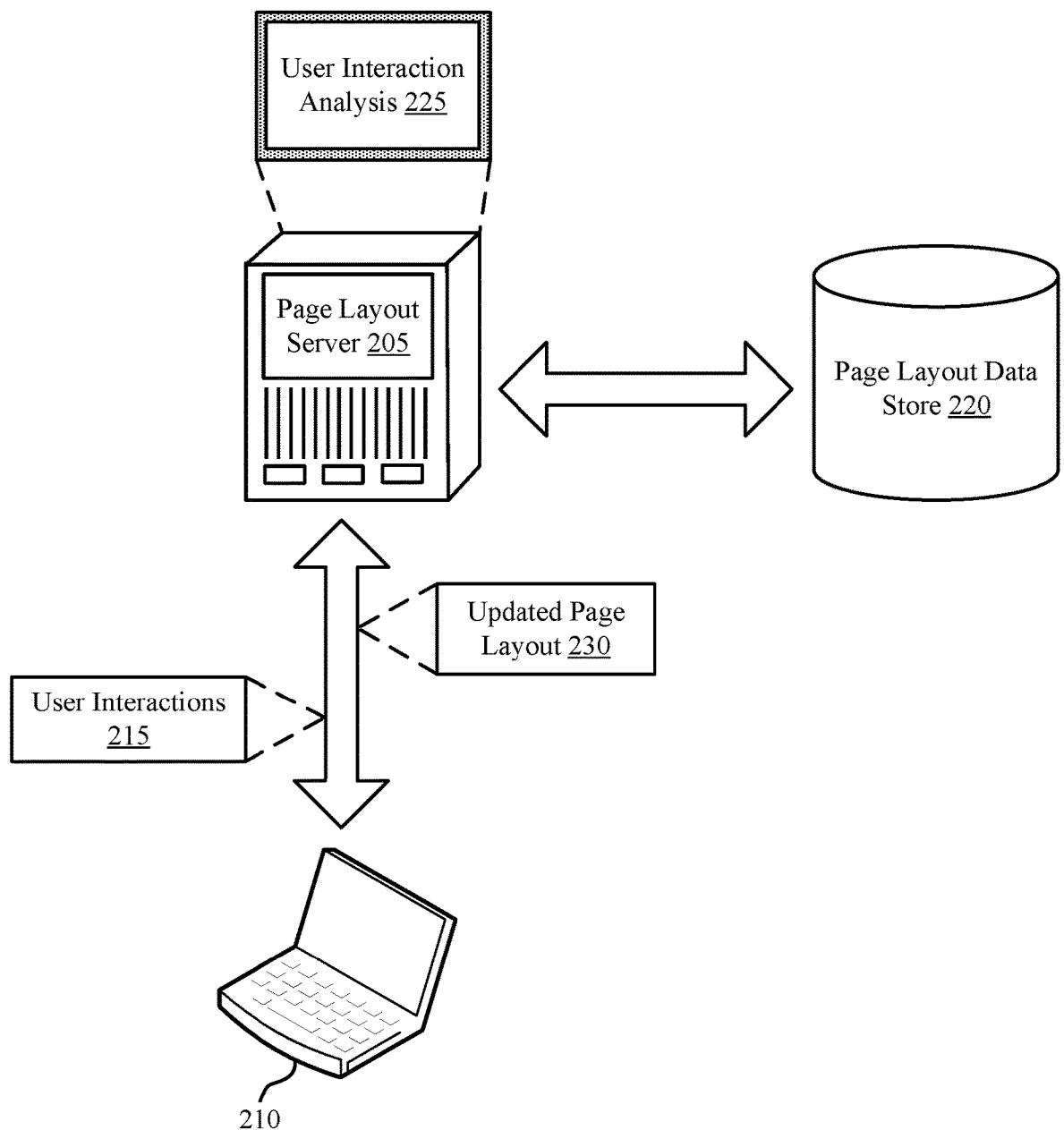
FIG. 2 illustrates an example of a page layout updating system that supports adjusting a user interface layout based on user usage patterns in accordance with aspects of the present disclosure.

FIG. 2 illustrates an example of a page layout updating system 200 that supports adjusting a user interface layout based on user usage patterns in accordance with aspects of the present disclosure. The page layout updating system 200 includes a page layout server 205, a user device 210, and a page layout data store 220. The page layout updating system 200 may implement aspects of a system 100 as described with reference to FIG. 1. For example, the page layout server 205 and/or the page layout data store 220 may be examples or components of a data center 120 and/or cloud platform 115, and the user device 210 may be an example of a cloud client 105 or a contact 110.

The page layout server 205 may represent aspects of an application server, communication server, data processing server, database server, cloud-based server, server cluster, virtual machine, container, or some similar data processing device or system. The page layout server 205 may communicate with other devices such the user device 210 and the page layout data store 220. The page layout server 205 may store an initial page layout in the page layout data store 220. In some examples, the initial page layout may correspond to a data object type, and the initial page layout may be defined by a first user and include a set of user interface components. For example, an initial page layout may display information for a standard data object (e.g., an object defined for all tenants of a multi-tenant database system, such as an Account data object, a Contact data object, a Lead data object, an Opportunity data object, a Case data object, or any other supported standard data object) or a custom data object (e.g., an object defined by a user of the system). The user interface components may include fields, buttons, related links, custom links, internal pages, or any combination of these or other supported components. In a specific example, a user (e.g., an administrative user) associated with the user device 210 may define the initial page layout, and the initial page layout may correspond to a data object of type Case (e.g., a customer case, a sales case, etc.) and include an events component as well as a case summary component. The initial page layout may be used as a default page layout, or the initial page layout may be used for users of one or more user types. The initial page layout may be transmitted or otherwise deployed to a group of users who are associated with a role (e.g., a sales role). In some cases, the initial page layout may be defined at an organization (e.g., tenant) level.

The page layout server 205 may track user interactions 215 with the components in the initial page layout. The tracked interactions may include the time spent on a page, the number of clicks on a page, the number of clicks on a component or component type, mouse movements, user eye movements, time to click, time to task completion, time spent on a task, common click paths through a page or through multiple pages, component size adjustments, component visibility adjustments, component location adjustments, or any combination of these or other user interactions with any facet of the page. The page layout server 205 may receive the user interactions 215 from the user device 210—or, more generally, from a set of user devices 210 accessing the page—and determine an updated page layout based on a user interaction analysis 225, which may improve user experience and efficiency.

The page layout updating system 200 may identify or obtain page usage and data requirements for a particular use. For example, the page layout server 205 may identify who a user is, the objects on a page and/or URL, how a user indicates interest in particular elements (e.g., elements or components on a page), page navigations, the components or data that the user interacts with, or the frequency of interacting with components or data. The page layout server 205 may recognize patterns or flows in the page usage data and predict pieces of data that are extraneous to a user. The page layout server 205 may additionally or alternatively suggest that some pieces of data are not retrieved (e.g., retrieved from an application programming interface (API)) or rendered. As such, the page layout updating system 200 may optimize or improve the performance and user interface of a user device 210, thereby improving the workflow of a user that is associated with the user device 210. In some cases, a machine learning and/or statistical analysis may be performed to identify data that is extraneous.

In some cases, the page layout server 205 may perform a user interaction analysis 225 to determine an updated page layout. The user interaction analysis 225 may be based on a statistical analysis, an artificial intelligence analysis, or a machine learning analysis. In some examples, the user interaction analysis 225 may be based on data mining or unsupervised machine learning. For example, the page layout server 205 may perform data clustering procedures (e.g., a k-means procedure, a mean-shift procedure, a density-based clustering procedure, etc.). In some cases, a clustering procedure may be used to identify user groups (e.g., groups of users that use a user interface in a similar fashion), and one or more updated page layouts may be determined and transmitted based on the user groups. In some additional or alternative examples, the page layout server 205 may perform an association rule generating procedure (e.g., an apriori procedure, an eclat procedure, a frequent pattern procedure, etc.). In some cases, the association rule generating procedure may be used to determine an updated page layout 230 from one or more users or user groups. An artificial neural network may additionally or alternatively be used in determining an updated page layout 230. For example, the artificial neural network may be trained on stored user interactions 215 that are associated with a group of users, and the artificial neural network may be used to predict or suggest an updated page layout 230 based on an initial page layout and/or user interactions 215. The page layout updating system 200 may improve user experience and improve user efficiency by suggesting or providing updated page layouts 230 for users based on the users' user interface usage behavior.

In some cases, user interactions 215 may include user interface click data. The user interactions 215 may be associated with a number of user devices 210, and the user interactions 215 may be analyzed at various aggregation levels. In some examples, user interactions 215 may be aggregated at a page level (e.g., a page identifier, a page route, a page type, etc.), a user level, a user role level, a user interface component level, or a combination thereof. For example, user interactions 215 may be aggregated based on a user role (e.g., a sales user) and a page. The page layout server 205 may determine, based on user interaction analyses 225 and in accordance with the methods and procedures described herein, one or more updated page layouts 230. The page layout server 205 may transmit an updated page layout 230 to users associated with user devices 210. In some cases, the page layout server 205 may transmit the updated page layout 230 to users that are associated with a specific user role or user group.

The page layout server 205 may associate tracked user interactions 215 to specific users (e.g., according to user credentials), specific user devices 210, specific types of user devices 210 or form factors (e.g., the page layout server 205 may determine a different updated page layout 230 for a laptop view as opposed to a smartphone view, even for the same user), specific user roles, or any combination thereof. The page layout server 205 may cluster the tracked user interactions 215 based on user groups (e.g., based on similar usage patterns or based on pre-defined groups by an administrative user) prior to user interaction analysis 225 or may determine clusters based on the user interaction analysis 225. In some cases, the page layout server 205 may implement statistical analysis. For example, the statistical analysis may determine click rates for different components based on the tracked user interactions 215 and may position and/or render these components in an updated page layout 230. In some other cases, the page layout server 205 may implement machine learning. For example, the page layout server 205 may input the user interactions 215 (e.g., all user interactions 215 or interactions for a specific group of users) into a machine learning model (e.g., a neural network) and may determine an updated page layout 230 as an output of the model (e.g., once the model is trained). Such a model may be built to optimize any number of parameters (e.g., loading time, rendering time, number of clicks on a page, time on a page, etc.). Furthermore, such optimizations may focus on averages across a set of users (e.g., the group of users to which the updated page layout 230 will apply). In some cases, the page layout server 205 may implement unsupervised learning to determine one or more models for user interaction analysis 225.

In some examples, the page layout server 205 may track scores (e.g., weights) for different user components for a given page. In some cases, the page layout server 205 may initially determine the scores based on an initial page layout (e.g., defined by an administrative user). The page layout server 205 may update the scores based on the user interactions 215. In some cases, how an administrative user assigns components may make up a first portion of the total score for a user interface component, while how users interact with the components may make up a second portion of the total score. In some examples, a relatively higher score may promote a component to a more favorable position in a page layout (e.g., nearer the top of the page, rendered using a larger portion of the user interface, etc.), while a relatively lower score may demote the component's position or may cause the component to be hidden (e.g., not rendered in the user interface). The page layout server 205 may support a process of re-baselining as page layouts are updated. For example, the initial page layout may correspond to the baseline page layout. As such, the user interaction analysis 225 may be performed with respect to this baseline. Subsequently, the page layout server 205 may update the baseline page layout. For example, the page layout server 205 may replace the baseline page layout with the updated page layout 230 (e.g., based on an input from an administrative user). Accordingly, subsequent user interaction analysis 225 may be performed with respect to the updated baseline.

One or more users may specify how the page layout optimization is performed. For example, a user may turn on or off the page layout optimization. Additionally or alternatively, if the page layout server 205 determines an updated page layout 230, the page layout server 205 may implement the updated page layout 230 in a number of ways. In a first example, the page layout server 205 may indicate to a user (e.g., via the user device 210) that an updated page layout 230 is available. The user may select to preview or implement the updated page layout 230. In a second example, another user (e.g., an administrative user) may select to implement the updated page layout 230 for a set of users. In a third example, the page layout server 205 may automatically push the updated page layout 230 to one or more users, for example, based on one or more triggers (e.g., based on the updated page layout 230 meeting a threshold performance improvement level, based on an update schedule, based on determining the updated page layout 230, or based on any other trigger). In some cases, the page layout server 205 may use the user interactions 215 to determine an estimated performance for an updated page layout 230. For example, the page layout server 205 may determine that a group of users used a first number of clicks to accomplish a set of tasks using the initial page layout, and may estimate that the group of users would have used a second number of clicks to accomplish the same set of tasks using the updated page layout 230. Based on a comparison of the first number of clicks and the second number of clicks, the page layout server 205 may determine a predicted performance increase associated with implementing the updated page layout 230 for the group of users.

Figure 3:
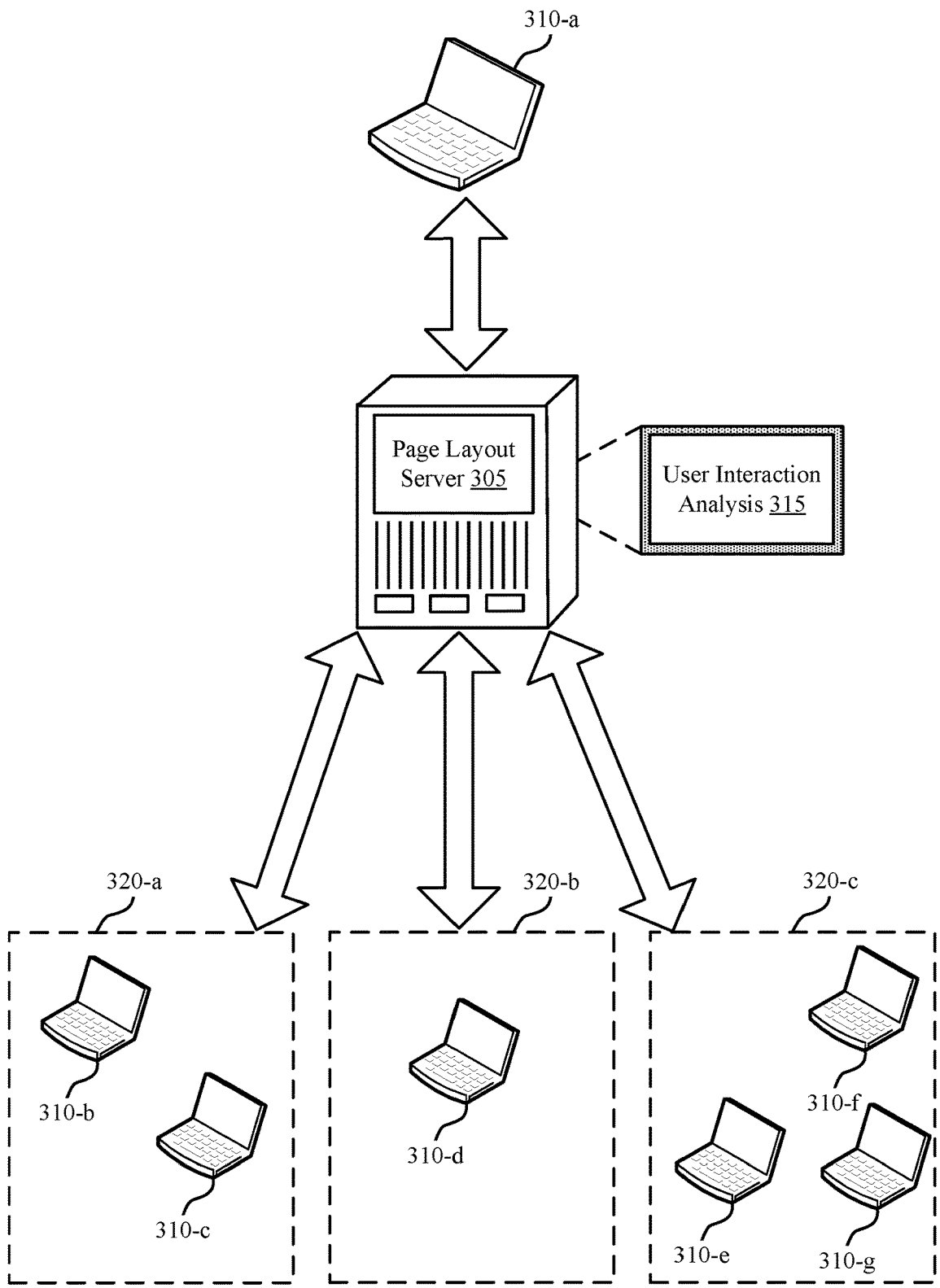
FIG. 3 illustrates an example of a page layout deployment system that supports adjusting a user interface layout based on user usage patterns in accordance with aspects of the present disclosure.

FIG. 3 illustrates an example of a page layout deployment system 300 that supports adjusting a user interface layout based on user usage patterns in accordance with aspects of the present disclosure. The page layout deployment system 300 includes a page layout server 305 and a number of user devices 310, which may be examples or components of one or more devices described with reference to FIGS. 1 and 2. For example, the page layout server 305 may be an example or component of a data center 120, a cloud platform 115, or a page layout server 205. The user devices 310 may be examples of or associated with cloud clients 105, contacts 110, or user devices 210.

The page layout deployment system 300 may improve user experience by supporting updating (e.g., customizing) page layouts. In some cases, a user (e.g., an administrative user, a supervising user, a user manager, etc.) associated with user device 310-a may design an initial page layout, and the page layout server 305 may transmit the initial page layout to a number of user devices 310. In some cases, the page layout server 305 may transmit the initial page layout to user devices 310 across all associated user groups 320 (e.g., across all users for a tenant, across all users associated with the user operating user device 310-a, etc.), while in some alternative cases, the page layout server 305 may transmit the initial page layout to a number of user devices 310 associated with one or more specific user groups 320. The page layout server 305 may track user interactions that are performed at user devices 310, perform a user interaction analysis 315, and transmit an updated page layout to user devices 310 based on the user interaction analysis 315. In some cases, user device 310-a may be associated with an administrative user, user device 310-b and user device 310-c may be associated with user group 320-a (e.g., a human resources group), user device 310-d may be associated with user group 320-b (e.g., an information technology group), and user device 310-e, user device 310-f, and user device 310-g may be associated with user group 320-c (e.g., a sales group). In some other cases, the user groups 320 may be determined analytically based on user clustering (e.g., according to similar user usage patterns). The page layout server 305 may transmit an initial page layout to the user devices 310 associated with a number of user groups 320 (e.g., user groups 320-a, 320-b, and 320-c), perform a user interaction analysis 315 for each of the number of user groups 320 to determine an updated page layout specific to a user group 320, and transmit the updated page layout to each respective user group 320.

An updated page layout may reduce system latency and improve user experience. In some cases, an updated page layout or an indication of an updated page layout may be transmitted to a user device 310, and the user device 310 may render a user interface based on the updated page layout. In some examples, a user device may experience reduced latency in rendering an updated page layout as compared to rendering an initial page layout. For example, each user interface component (e.g., pane, field, facet, icon, etc.) loaded and rendered in a user interface can negatively affect the loading time for the page. To improve the loading and/or rendering efficiency, an updated page layout may omit extraneous data as compared to the initial page layout or contain an indication for the user device 310 to refrain from loading data associated with some user interface components. In some additional or alternative examples, an updated page layout may indicate an ordering of user interface components which may create a perceived performance increase for a user associated with the user device 310. For example, an updated page layout may indicate components that are associated with important or often frequented data, and the indicated components may be rendered in a location on the user interface (e.g., the top of the page, in the page header, on a page side panel, etc.) such that these components are rendered prior to other less important components (e.g., components further down the page that may be outside an initial view of the page) to create a perceived performance increase. That is, a user may experience a perceived performance increase based on a time to render the initial view of the page (e.g., where components on the page not visible in the initial view may be rendered as a background process), such that the user may interact with the page once the components displayed in the initial view are rendered and prior to—or concurrent to—loading and/or rendering of additional components outside the initial view of the page.

As illustrated, in some systems, the user (e.g., an administrative user) operating user device 310-a may define a page display (e.g., an initial page display), but other users distinct from the user operating user device 310-a may be the ones interacting with the page display. As such, the user defining the page display may fail to understand which user interface components are most valuable or most often used by the users interacting with the page display. Accordingly, by retrieving and analyzing actual user interaction data at the page layout server 305, the page layout deployment system 300 may improve a page display based on how the page is actually used by a set of users, not based on how any one user or group of users believe the page is used. Furthermore, in some cases, certain users may not have the requisite credentials to update a page layout. For example, the administrative user may be authorized to define page layouts, while other users (e.g., users operating user devices 310-b through 310-g) may not be. However, based on the user interaction analysis 315, the page layout server 305 may customize a page layout specific to a user or group of users who may not be authorized to perform such customizations themselves.

Figure 4:
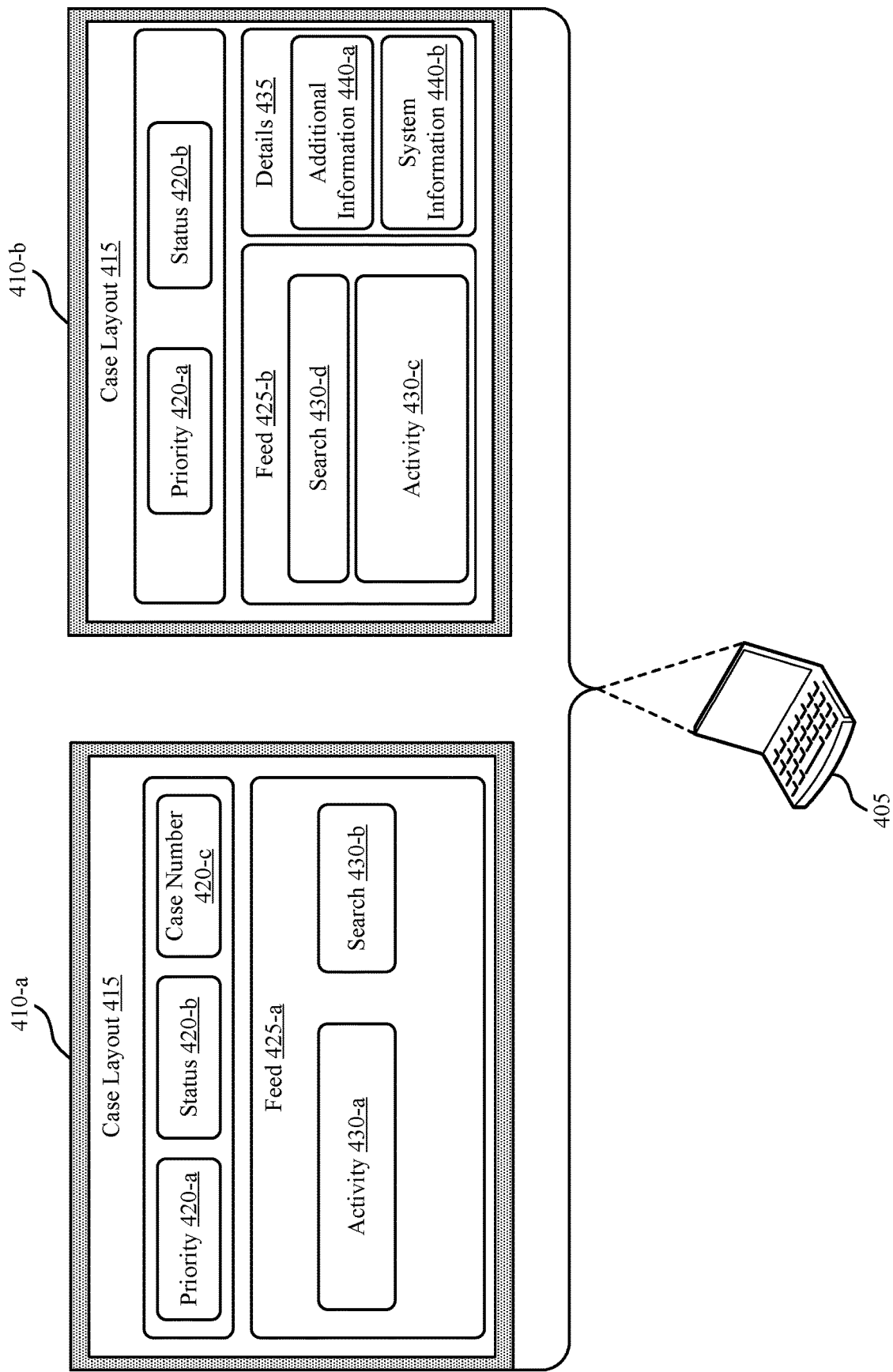
FIG. 4 illustrates an example of a user device including a user interface that supports adjusting a user interface layout based on user usage patterns in accordance with aspects of the present disclosure.

FIG. 4 illustrates an example of a user device 405 including a user interface 410 that supports adjusting a user interface layout based on user usage patterns in accordance with aspects of the present disclosure. User device 405 may be an example or component of a cloud client 105, a contact 110, a user device 210, or a user device 310 as described with reference to FIGS. 1 through 3. The user device 405 may display a number of different versions of a user interface 410. For example, user interface 410-a may support an initial page layout and user interface 410-b may support an updated page layout. A page layout may include standard objects, custom objects, or a combination thereof.

A page layout may correspond to the identity of a page. For example, a page may represent a view into a specific date record of a specific data object type stored in a database system. For example, as illustrated, the page layout may have a unique key or identifier corresponding to a page layout for a specific data object type, such as the "Case" data object type. The page layout may include components, and these components may be updated as described herein (e.g., for a given page identifier or unique key). Within the database system, each data object type may have one or more related data object types. Accordingly, each data record may have one or more related data records. A page may display such related data records (e.g., as links to other pages for these related data records). Additionally, the page may display values (e.g., editable or read-only) and/or support functions associated with the data record, the related data records, or both. In some cases, the data object types, related data object types, data fields for a data object type, or any combination thereof may support customization by a user. Additionally or alternatively, a page may be defined to display aggregate data from multiple data records or data object types.

In some cases, the user device 405 may receive an initial page layout or an indication of the initial page layout and render or otherwise display user interface 410-a. User interface 410-a may be associated with a user group, a page, a page type, an object type, a set of user interface components, or any combination thereof. In some examples, user interface 410-a may be associated with a page type (e.g., case layout 415) as well as a number of user interface components (e.g., priority 420-a, status 420-b, and case number 420-c, feed 425-a, activity 430-a, and search 430-b). In some cases, the initial page layout may be rendered at a number of user devices associated with a user group, a number of user devices associated with different user groups, a number of user devices not associated with a user group, or any combination thereof.

In some cases, the user device 405 may receive an updated page layout or an indication of the updated page layout and render or otherwise display user interface 410-b. User interface 410-b may be associated with a user group, a page, a page type, an object type, a set of user interface components, or any combination thereof. User interface 410-b may additionally be based on a user interaction analysis. For example, a server (e.g., a page layout server) may obtain data based on user interactions with the user interface 410-a and perform a user interaction analysis based on the user interaction data. User interface 410-b may be based on the user interaction analysis, and user interface 410-b may improve user experience and efficiency.

In some examples, the size of a user interface component may be altered in an updated page layout and/or user interface. For example, the size of feed 425-b may be decreased based on a user interaction analysis, and search 430-d as well as activity 430-c may be moved. In some cases, an icon or display format for a user interface component may be modified in the updated page layout. Components may be identified as "low use" based on the user interaction analysis, and user interface 410-b may display such components based on the user interaction analysis. The perceived performance of user interface 410-b may be improved based on the arrangement of the user interface components. In some examples, case number 420-c may not be rendered, which may reduce the latency associated with rendering user interface 410-b. Additionally, in some cases, the data associated with case number 420-c may not be retrieved from an API, which may improve the performance of user interface 410-b. In some additional or alternative examples, additional components may be added to user interface 410-b. For example, the user interaction analysis may determine that users often navigate to a details component from user interface 410-a, so user interface 410-b may display the details component 435 to save users time and reduce the number of clicks needed to navigate to the details component 435. User interface 420-b may further display additional information 440-a and system information 440-b. It is to be understood that the user interfaces 410-a and 410-b are examples, and further user interfaces 410, components, and optimizations are supported by the processes described herein.

Figure 5:
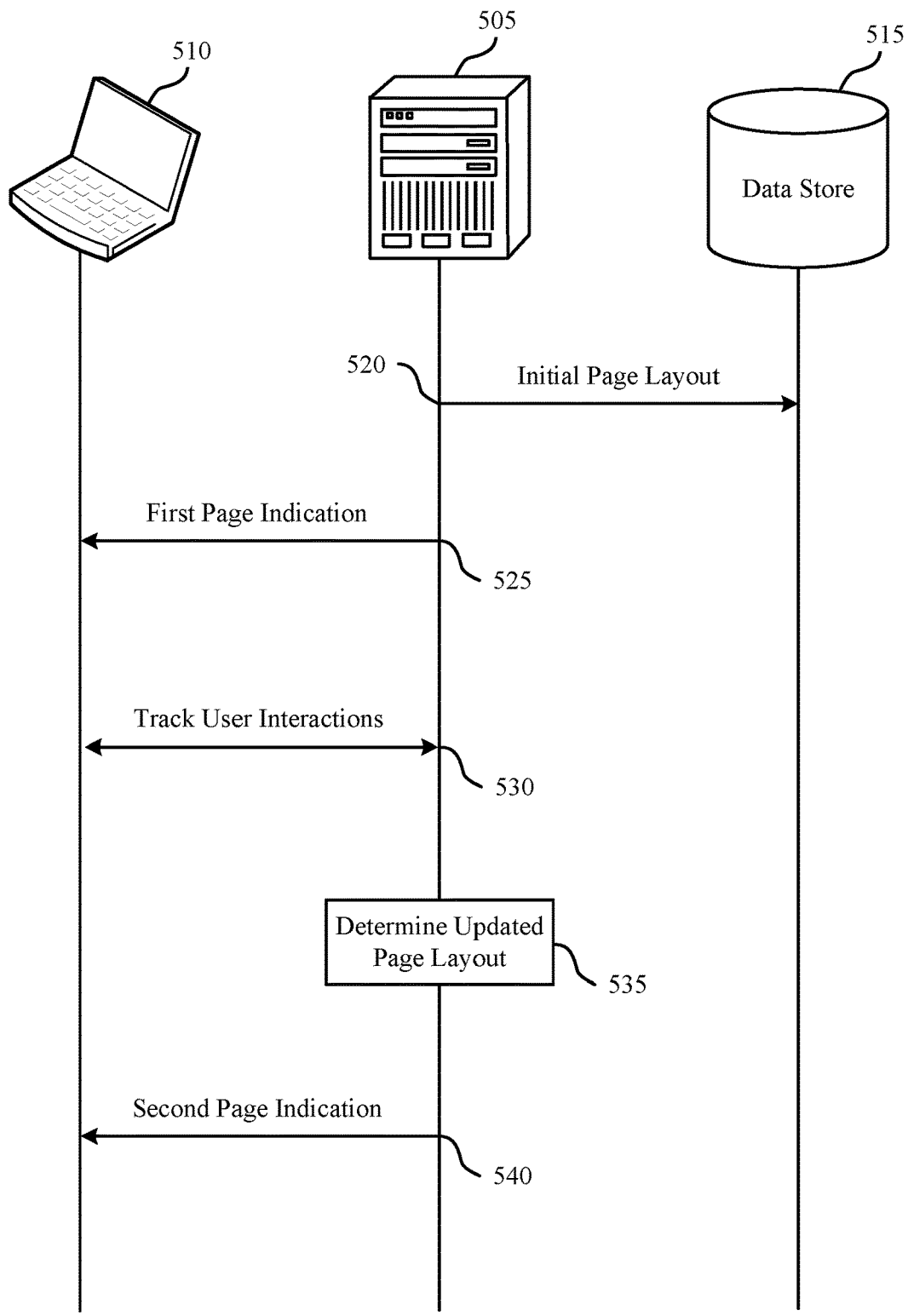
FIG. 5 illustrates an example of a process flow that supports adjusting a user interface layout based on user usage patterns in accordance with aspects of the present disclosure.

FIG. 5 illustrates an example of a process flow 500 that supports adjusting a user interface layout based on user usage patterns in accordance with aspects of the present disclosure. The process flow 500 includes a page layout server 505, a user device 510, and a data store 515. These may be examples of the corresponding devices described with reference to FIGS. 1 through 4. The page layout server 505 may implement adjusting a user interface layout based on user usage patterns, which may improve user experience, reduce system latency, and improve user efficiency. Alternative examples of the following may be implemented, where some steps are performed in a different order than described or are not performed at all. In some cases, steps may include additional features not mentioned below, or further steps may be added.

At 520, the page layout server 505 may store an initial page layout for a page. The page may correspond to a data object type stored in the data store 515. The page layout server 505 may store the initial page layout locally or may store the initial page layout in the data store 515. The initial page layout may be defined by a first user (e.g., an administrative user) and may include a set of user interface components.

At 525, the page layout server 505 may transmit a first indication to a user device 510 operated by a user distinct from the first user. In some cases, the page layout server 505 may transmit the first indication to a set of user devices 510. The first indication of the page for display by the set of user devices 510 may transmitted in accordance with the initial page layout.

At 530, the page layout server 505 may track, for the set of user devices, user interactions with the set of user interface components in the initial page layout. In some cases, the page layout server 505 may request data associated with user interactions, while in some additional or alternative examples, a number of user devices 510 may transmit user interaction data to the page layout server 505.

At 535, the page layout server 505 may determine an updated page layout for the page based on an analysis of the tracked user interactions and the initial page layout, where the updated page layout is different from the initial page layout. The updated page layout, as compared to the initial page layout, may modify what components are displayed, where the components are displayed, how the components are displayed, or any combination thereof.

At 540, the page layout server 505 may transmit a second indication of the page for display by the set of user devices 510 according to the updated page layout. In some examples, the page layout server 505 may additionally store the updated page layout (e.g., locally or in the data store 515). In some cases, the page layout server 505 may replace the initial page layout with the updated page layout (e.g., for future data requests).

Figure 6:
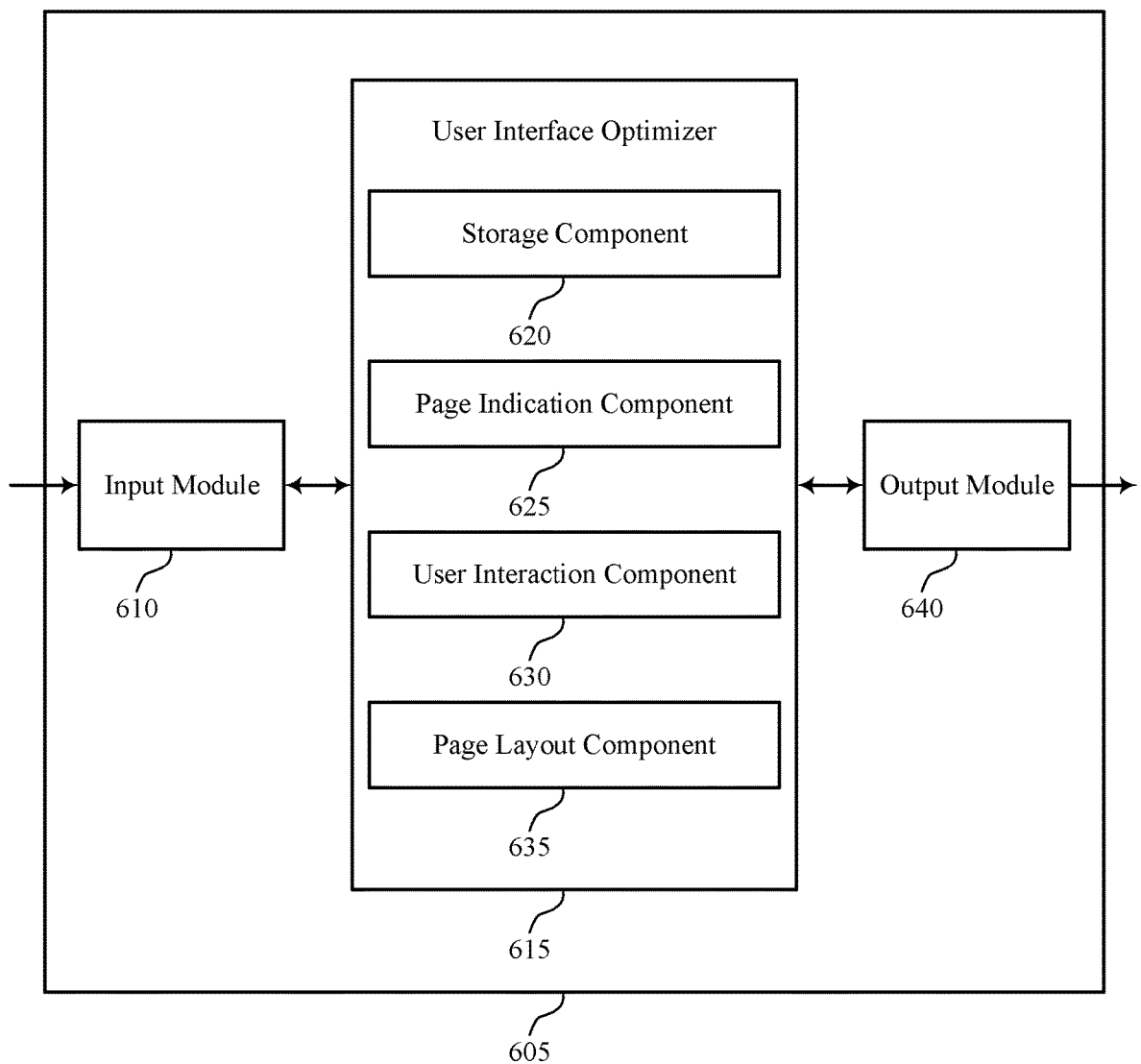
FIG. 6 shows a block diagram of an apparatus that supports adjusting a user interface layout based on user usage patterns in accordance with aspects of the present disclosure.

FIG. 6 shows a block diagram 600 of an apparatus 605 that supports adjusting a user interface layout based on user usage patterns in accordance with aspects of the present disclosure. The apparatus 605 may include an input module 610, a user interface optimizer 615, and an output module 640. The apparatus 605 may also include a processor. Each of these components may be in communication with one another (e.g., via one or more buses). In some cases, the apparatus 605 may be an example of a user terminal, a server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the user interface optimizer 615 to support adjusting a user interface layout. In some cases, the input module 610 may be a component of an input/output (I/O) controller 815 as described with reference to FIG. 8.

The user interface optimizer 615 may include a storage component 620, a page indication component 625, a user interaction component 630, and a page layout component 635. The user interface optimizer 615 may be an example of aspects of the user interface optimizer 705 or 810 described with reference to FIGS. 7 and 8.

The user interface optimizer 615 and/or at least some of its various sub-components may be implemented in hardware, software executed by a processor, firmware, or any combination thereof. If implemented in software executed by a processor, the functions of the user interface optimizer 615 and/or at least some of its various sub-components may be executed by a general-purpose processor, a central processing unit (CPU), a graphics processing unit (GPU), a graphics card, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The user interface optimizer 615 and/or at least some of its various sub-components may be physically located at various positions, including being distributed such that portions of functions are implemented at different physical locations by one or more physical devices. In some examples, the user interface optimizer 615 and/or at least some of its various sub-components may be a separate and distinct component in accordance with various aspects of the present disclosure. In other examples, the user interface optimizer 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The storage component 620 may store an initial page layout for a page corresponding to a data object type stored in a database, where the initial page layout is defined by a first user and includes a set of user interface components. The page indication component 625 may transmit, to a set of user devices operated by a set of users distinct from the first user, a first indication of the page for display by the set of user devices according to the initial page layout.

The user interaction component 630 may track, for the set of user devices, user interactions with the set of user interface components in the initial page layout. The page layout component 635 may determine an updated page layout for the page based on an analysis of the tracked user interactions and the initial page layout, where the updated page layout is different from the initial page layout. The page indication component 625 may transmit a second indication of the page for display by the set of user devices according to the updated page layout.

The output module 640 may manage output signals for the apparatus 605. For example, the output module 640 may receive signals from other components of the apparatus 605, such as the user interface optimizer 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
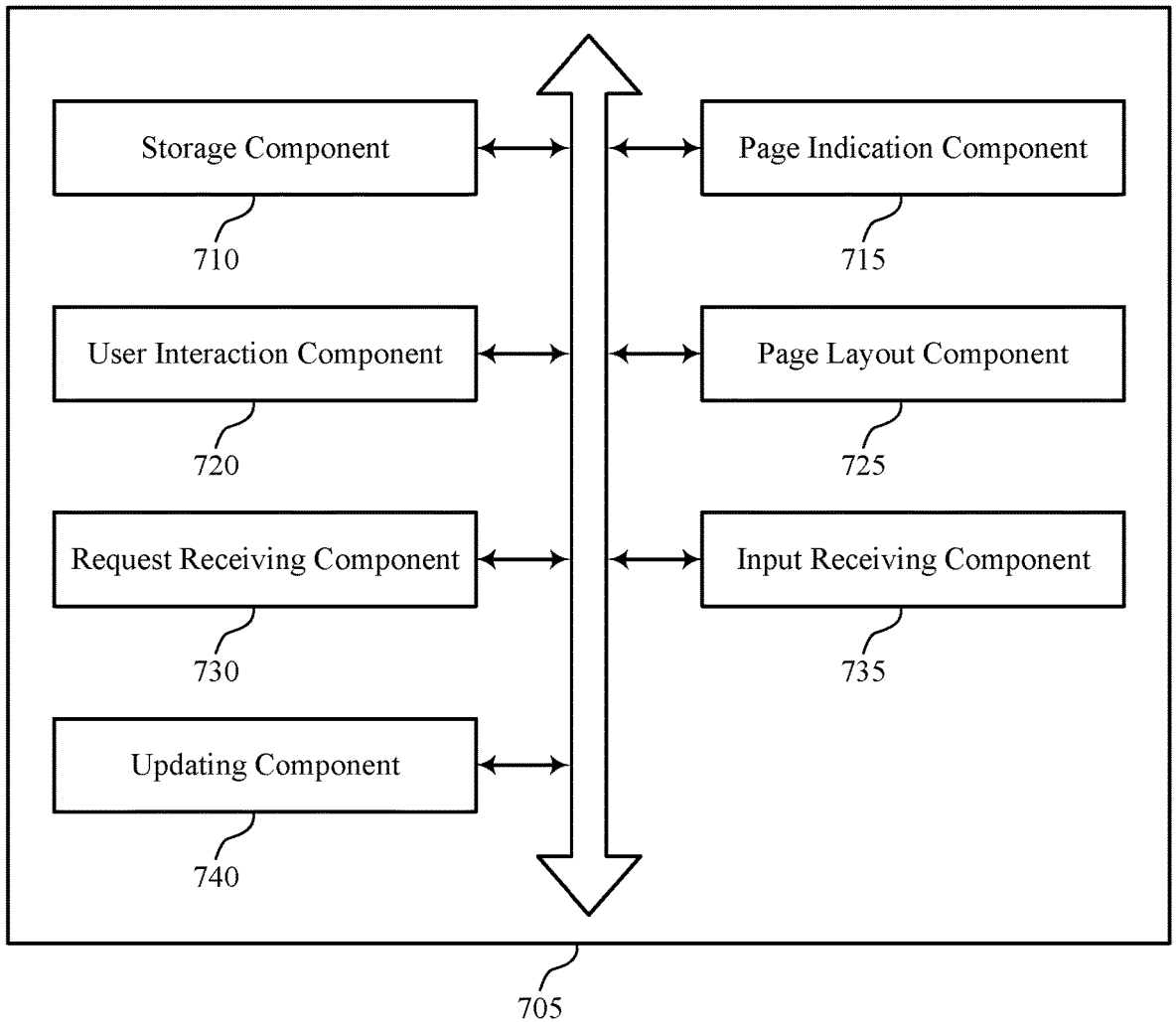
FIG. 7 shows a block diagram of a user interface optimizer that supports adjusting a user interface layout based on user usage patterns in accordance with aspects of the present disclosure.

FIG. 7 shows a block diagram 700 of a user interface optimizer 705 that supports adjusting a user interface layout based on user usage patterns in accordance with aspects of the present disclosure. The user interface optimizer 705 may be an example of aspects of a user interface optimizer 615 or a user interface optimizer 810 described herein. The user interface optimizer 705 may include a storage component 710, a page indication component 715, a user interaction component 720, a page layout component 725, a request receiving component 730, an input receiving component 735, an updating component 740, or any combination of these or other components. Each of these components may communicate, directly or indirectly, with one another (e.g., via one or more buses).

The storage component 710 may store an initial page layout for a page corresponding to a data object type stored in a database, where the initial page layout is defined by a first user and includes a set of user interface components. The page indication component 715 may transmit, to a set of user devices operated by a set of users distinct from the first user, a first indication of the page for display by the set of user devices according to the initial page layout.

The user interaction component 720 may track, for the set of user devices, user interactions with the set of user interface components in the initial page layout. The page layout component 725 may determine an updated page layout for the page based on an analysis of the tracked user interactions and the initial page layout, where the updated page layout is different from the initial page layout. The page indication component 715 may transmit a second indication of the page for display by the set of user devices according to the updated page layout.

In some examples, the page indication component 715 may transmit, to a second set of user devices operated by a second set of users different from the set of users, a third indication of the page for display by the second set of user devices according to the initial page layout, where tracking the user interactions includes tracking, for the set of user devices and the second set of user devices, the user interactions with the set of user interface components in the initial page layout. In some examples, the page layout component 725 may determine a second updated page layout for the page based on the analysis of the tracked user interactions and the initial page layout, where the second updated page layout is associated with the second set of user devices and is different from the initial page layout and the updated page layout. In some such examples, the page indication component 715 may transmit a fourth indication of the page for display by the second set of user devices according to the second updated page layout.

The request receiving component 730 may receive a first request from a user device of the set of user devices to view a data object of the data object type stored in the database, where the first indication of the page for display by the user device according to the initial page layout is transmitted to the user device in response to receiving the first request, and may receive a second request from the user device of the set of user devices to view the data object of the data object type stored in the database, where the second indication of the page for display by the user device according to the updated page layout is transmitted to the user device in response to receiving the second request.

In some examples, the input receiving component 735 may receive a user input from the first user indicating the updated page layout. In some such examples, the storage component 710 may store the updated page layout for the page corresponding to the data object type stored in the database, where the updated page layout replaces the initial page layout as a baseline page layout for the page based on the user input from the first user. In some cases, the user interaction component 720 may track, for the set of user devices, additional user interactions with the set of user interface components in the updated page layout. In some such cases, the page layout component 725 may determine a further updated page layout for the page based on an analysis of the tracked additional user interactions and the updated page layout, where the further updated page layout is different from the updated page layout.

In some examples, the input receiving component 735 may receive a user input accepting the updated page layout from a user of the set of users, the first user, or a combination thereof, where the second indication of the page for display by the set of user devices according to the updated page layout is transmitted based on the user input.

In some examples, the updating component 740 may automatically update the initial page layout with the updated page layout for the page based on determining the updated page layout, a trigger condition, an update schedule, or a combination thereof, where the second indication of the page for display by the set of user devices according to the updated page layout is transmitted based on the automatic updating.

In some examples, the updated page layout includes an updated set of user interface components. In some such examples, the page indication component 715 may transmit, to a user device of the set of user devices, a data value for the first indication of the page for display by the user device according to the initial page layout based on a user interface component of the set of user interface components including the data value. The page indication component 715 may refrain from transmitting, to the user device, the data value for the second indication of the page for display by the user device according to the updated page layout based on the updated set of user interface components not including the data value.

In some examples, determining the updated page layout for the page may involve the page layout component 725 inputting the tracked user interactions, the initial page layout, or a combination thereof into a machine learning model, where the machine learning model outputs an indication of the updated page layout. Additionally or alternatively, determining the updated page layout for the page may involve the page layout component 725 performing a statistical analysis on the tracked user interactions, the initial page layout, or a combination thereof, where the updated page layout is determined based on the statistical analysis.

In some cases, the updated page layout may include an updated set of user interface components, and the updated page layout for the page may be determined based on a number of clicks for each user interface component of the set of user interface components, a number of page reloads for the page, an amount of time accessing the page, an amount of time between accessing the page and a user click on the page, an amount of time for completing a task associated with the page, or a combination thereof.

In some examples, tracking the user interactions may involve the storage component 710 storing, for each user click in a user interface displaying the initial page layout, a user performing the user click, a user interface component clicked on by the user click, a timestamp for the user click, a timestamp for accessing the page, a next page accessed by the user based on the user click, a timestamp for accessing the next page, a task associated with the user click, or a combination thereof.

In some cases, the updated set of user interface components is different from the set of user interface components, positioning of the updated set of user interface components is different from positioning of the set of user interface components, display icons for the updated set of user interface components are different from display icons for the set of user interface components, an order for rendering the updated set of user interface components is different from an order for rendering the set of user interface components, or a combination thereof.

In some cases, the first user is authorized to define a page layout for the page, while at least one user of the set of users is unauthorized to define the page layout for the page.

Figure 8:
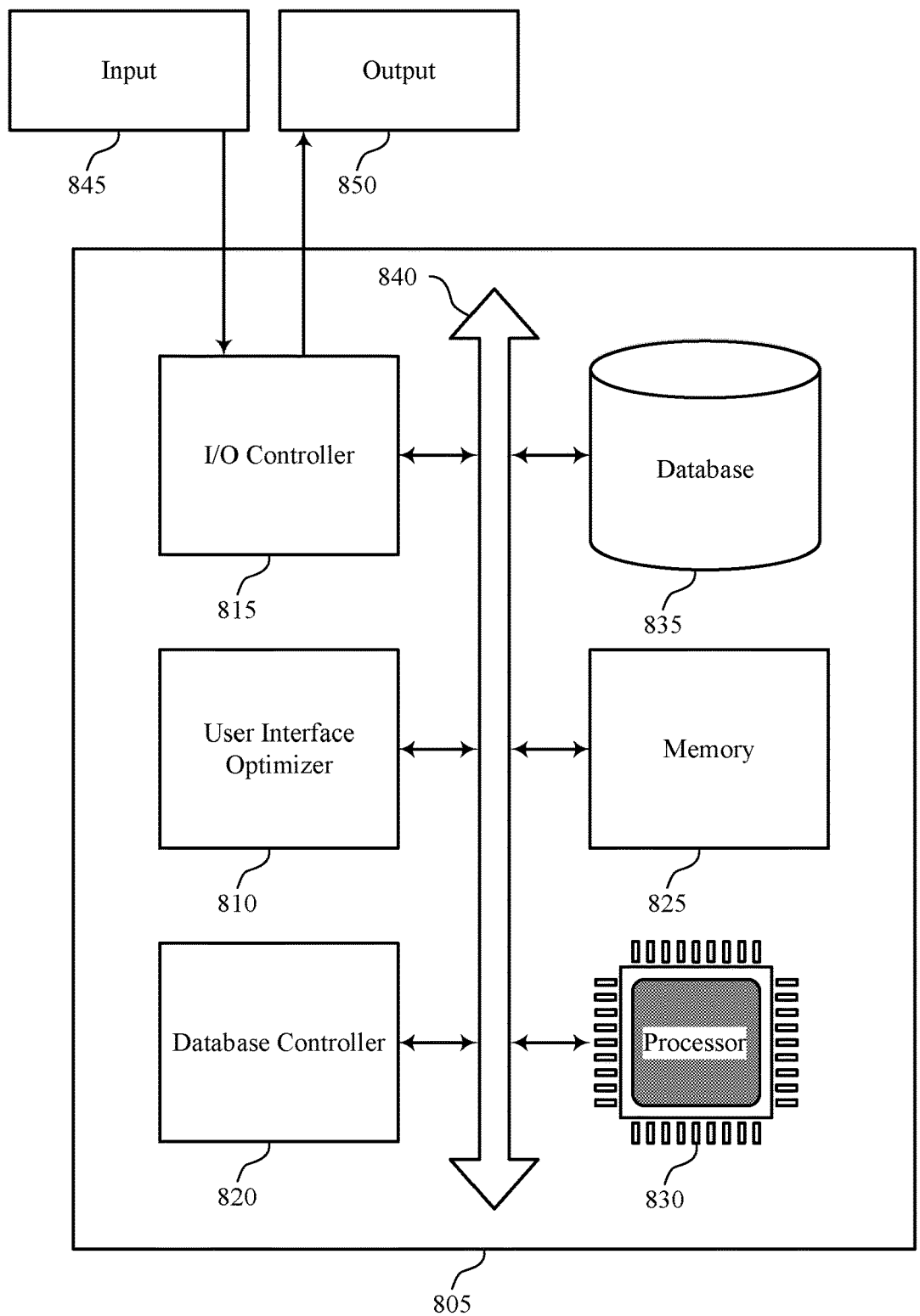
FIG. 8 shows a diagram of a system including a device that supports adjusting a user interface layout based on user usage patterns in accordance with aspects of the present disclosure.

FIG. 8 shows a diagram of a system 800 including a device 805 that supports adjusting a user interface layout based on user usage patterns in accordance with aspects of the present disclosure. The device 805 may be an example of or include the components of an application server or an apparatus 605 as described herein. The device 805 may include components for bi-directional data communications including components for transmitting and receiving communications, including a user interface optimizer 810, an I/O controller 815, a database controller 820, memory 825, a processor 830, and a database 835. These components may be in electronic communication via one or more buses (e.g., bus 840).

The user interface optimizer 810 may be an example of a user interface optimizer 615 or 705 as described herein. For example, the user interface optimizer 810 may perform any of the methods or processes described above with reference to FIGS. 6 and 7. In some cases, the user interface optimizer 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a CPU, a GPU, a graphics card, a DSP, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting adjusting a user interface layout based on user usage patterns).

Figure 9:
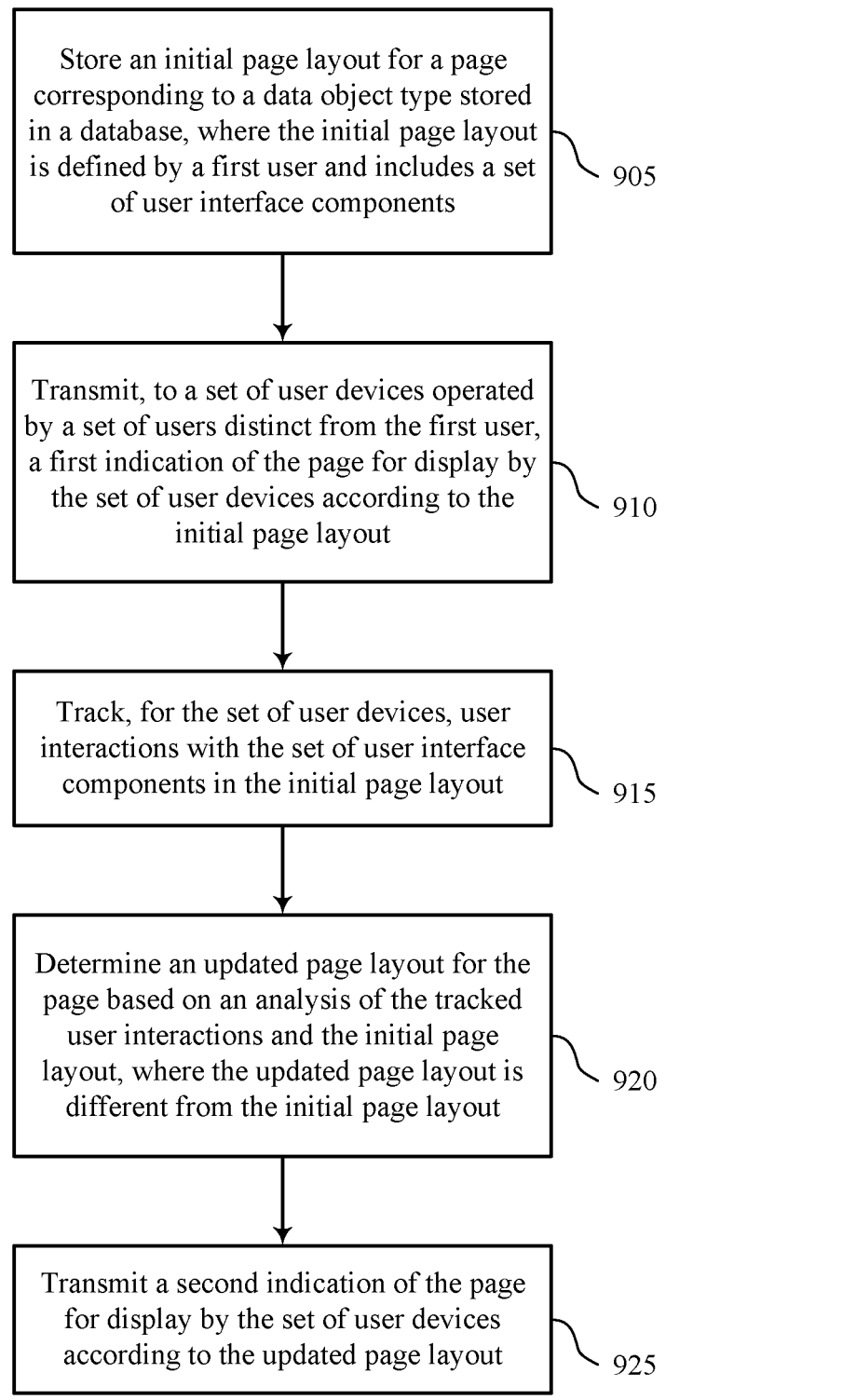
FIGS. 9 through 11 show flowcharts illustrating methods that support adjusting a user interface layout based on user usage patterns in accordance with aspects of the present disclosure.

FIG. 9 shows a flowchart illustrating a method 900 that supports adjusting a user interface layout based on user usage patterns in accordance with aspects of the present disclosure. The operations of method 900 may be implemented by an application server (e.g., a single server, a server cluster, a database server, a cloud-based server, a virtual machine, a container, or any other device or system supporting data processing) or its components as described herein. For example, the operations of method 900 may be performed by a user interface optimizer as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may store an initial page layout for a page corresponding to a data object type stored in a database, where the initial page layout is defined by a first user and includes a set of user interface components. The operations of 905 may be performed according to the methods described herein. In some examples, aspects of the operations of 905 may be performed by a storage component as described with reference to FIGS. 6 through 8.

At 910, the application server may transmit, to a set of user devices operated by a set of users distinct from the first user, a first indication of the page for display by the set of user devices according to the initial page layout. The operations of 910 may be performed according to the methods described herein. In some examples, aspects of the operations of 910 may be performed by a page indication component as described with reference to FIGS. 6 through 8.

At 915, the application server may track, for the set of user devices, user interactions with the set of user interface components in the initial page layout. The operations of 915 may be performed according to the methods described herein. In some examples, aspects of the operations of 915 may be performed by a user interaction component as described with reference to FIGS. 6 through 8.

At 920, the application server may determine an updated page layout for the page based on an analysis of the tracked user interactions and the initial page layout, where the updated page layout is different from the initial page layout. The operations of 920 may be performed according to the methods described herein. In some examples, aspects of the operations of 920 may be performed by a page layout component as described with reference to FIGS. 6 through 8.

At 925, the application server may transmit a second indication of the page for display by the set of user devices according to the updated page layout. The operations of 925 may be performed according to the methods described herein. In some examples, aspects of the operations of 925 may be performed by a page indication component as described with reference to FIGS. 6 through 8.

Figure 10:
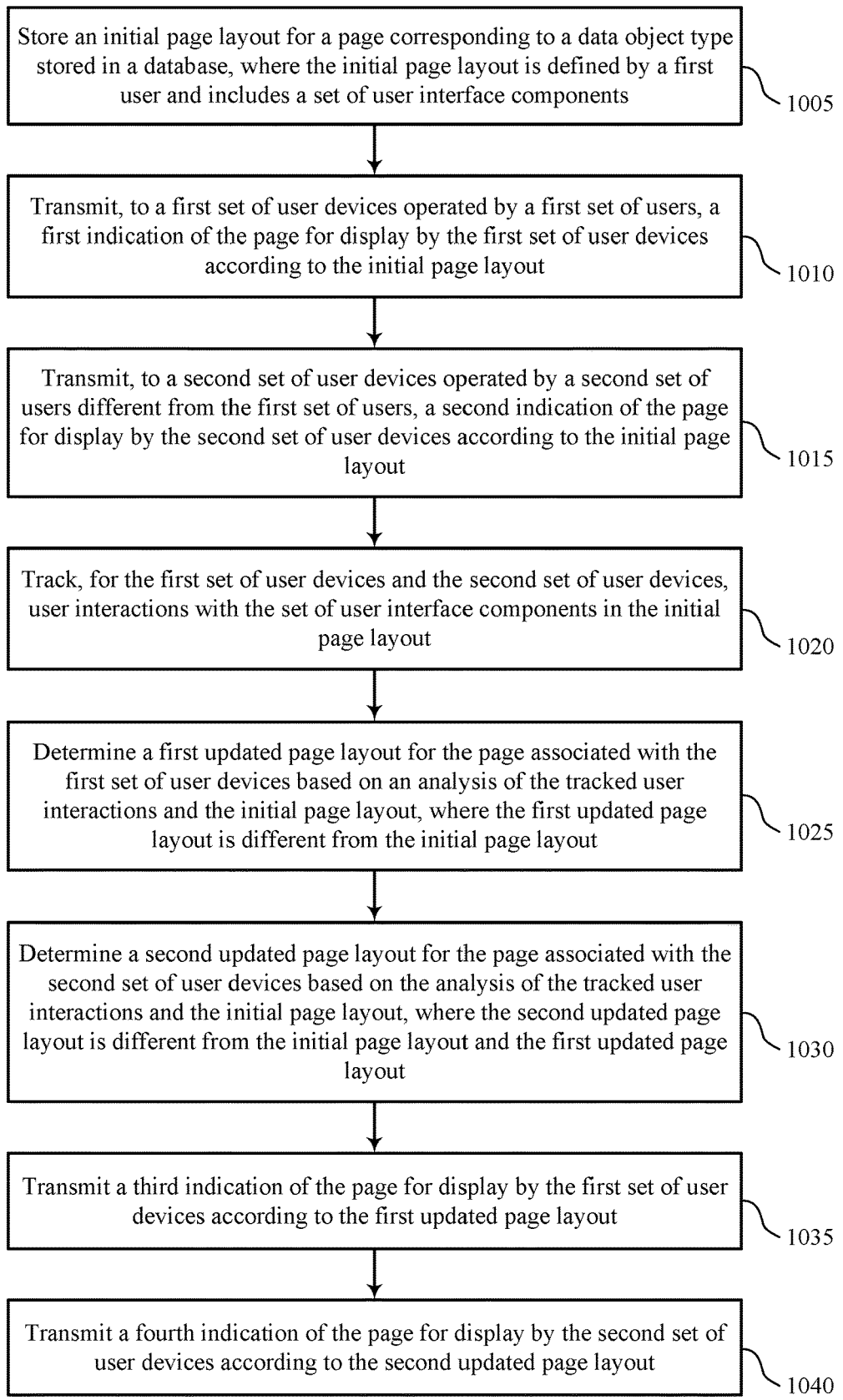

FIG. 10 shows a flowchart illustrating a method 1000 that supports adjusting a user interface layout based on user usage patterns in accordance with aspects of the present disclosure. The operations of method 1000 may be implemented by an application server or its components as described herein. For example, the operations of method 1000 may be performed by a user interface optimizer as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may store an initial page layout for a page corresponding to a data object type stored in a database, where the initial page layout is defined by a first user and includes a set of user interface components. The operations of 1005 may be performed according to the methods described herein. In some examples, aspects of the operations of 1005 may be performed by a storage component as described with reference to FIGS. 6 through 8.

At 1010, the application server may transmit, to a first set of user devices operated by a first set of users distinct from the first user, a first indication of the page for display by the first set of user devices according to the initial page layout. The operations of 1010 may be performed according to the methods described herein. In some examples, aspects of the operations of 1010 may be performed by a page indication component as described with reference to FIGS. 6 through 8.

At 1015, the application server may transmit, to a second set of user devices operated by a second set of users different from the first set of users, a second indication of the page for display by the second set of user devices according to the initial page layout. The operations of 1015 may be performed according to the methods described herein. In some examples, aspects of the operations of 1015 may be performed by a page indication component as described with reference to FIGS. 6 through 8.

At 1020, the application server may track, for the first set of user devices and the second set of user devices, user interactions with the set of user interface components in the initial page layout. The operations of 1020 may be performed according to the methods described herein. In some examples, aspects of the operations of 1020 may be performed by a user interaction component as described with reference to FIGS. 6 through 8.

At 1025, the application server may determine a first updated page layout for the page associated with the first set of user devices based on an analysis of the tracked user interactions and the initial page layout, where the first updated page layout is different from the initial page layout. The operations of 1025 may be performed according to the methods described herein. In some examples, aspects of the operations of 1025 may be performed by a page layout component as described with reference to FIGS. 6 through 8.

At 1030, the application server may determine a second updated page layout for the page associated with the second set of user devices based on the analysis of the tracked user interactions and the initial page layout, where the second updated page layout is different from the initial page layout and the first updated page layout. The operations of 1030 may be performed according to the methods described herein. In some examples, aspects of the operations of 1030 may be performed by a page layout component as described with reference to FIGS. 6 through 8.

At 1035, the application server may transmit a third indication of the page for display by the first set of user devices according to the first updated page layout. The operations of 1035 may be performed according to the methods described herein. In some examples, aspects of the operations of 1035 may be performed by a page indication component as described with reference to FIGS. 6 through 8.

At 1040, the application server may transmit a fourth indication of the page for display by the second set of user devices according to the second updated page layout. The operations of 1040 may be performed according to the methods described herein. In some examples, aspects of the operations of 1040 may be performed by a page indication component as described with reference to FIGS. 6 through 8.

Figure 11:
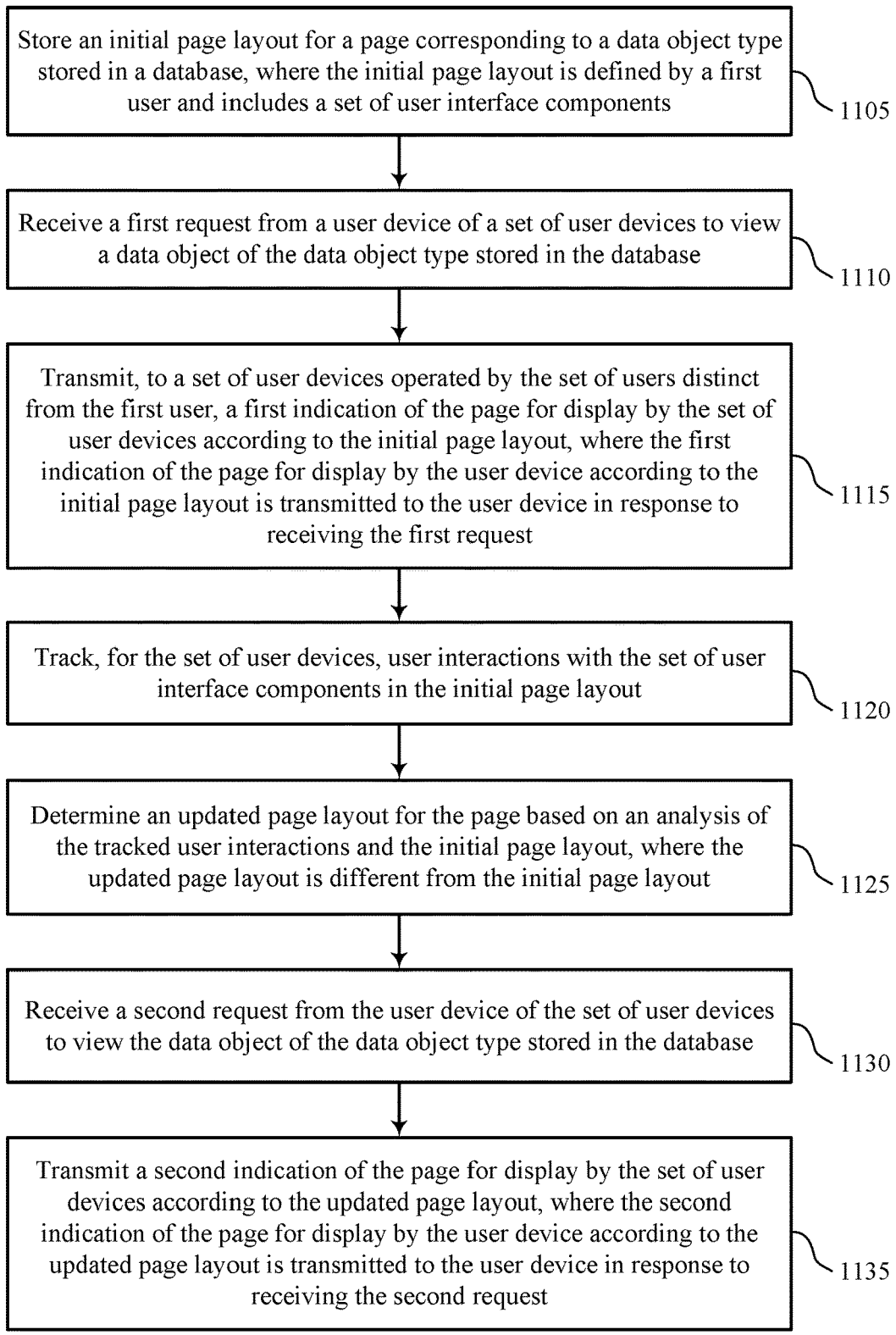

FIG. 11 shows a flowchart illustrating a method 1100 that supports adjusting a user interface layout based on user usage patterns in accordance with aspects of the present disclosure. The operations of method 1100 may be implemented by an application server or its components as described herein. For example, the operations of method 1100 may be performed by a user interface optimizer as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may store an initial page layout for a page corresponding to a data object type stored in a database, where the initial page layout is defined by a first user and includes a set of user interface components. The operations of 1105 may be performed according to the methods described herein. In some examples, aspects of the operations of 1105 may be performed by a storage component as described with reference to FIGS. 6 through 8.

At 1110, the application server may receive a first request from a user device of a set of user devices to view a data object of the data object type stored in the database. The operations of 1110 may be performed according to the methods described herein. In some examples, aspects of the operations of 1110 may be performed by a request receiving component as described with reference to FIGS. 6 through 8.

At 1115, the application server may transmit, to the set of user devices operated by a set of users distinct from the first user, a first indication of the page for display by the set of user devices according to the initial page layout. The first indication of the page for display by the user device according to the initial page layout may be transmitted to the user device in response to receiving the first request. The operations of 1115 may be performed according to the methods described herein. In some examples, aspects of the operations of 1115 may be performed by a page indication component as described with reference to FIGS. 6 through 8.

At 1120, the application server may track, for the set of user devices, user interactions with the set of user interface components in the initial page layout. The operations of 1120 may be performed according to the methods described herein. In some examples, aspects of the operations of 1120 may be performed by a user interaction component as described with reference to FIGS. 6 through 8.

At 1125, the application server may determine an updated page layout for the page based on an analysis of the tracked user interactions and the initial page layout, where the updated page layout is different from the initial page layout. The operations of 1125 may be performed according to the methods described herein. In some examples, aspects of the operations of 1125 may be performed by a page layout component as described with reference to FIGS. 6 through 8.

At 1130, the application server may receive a second request from the user device of the set of user devices to view the data object of the data object type stored in the database. The operations of 1130 may be performed according to the methods described herein. In some examples, aspects of the operations of 1130 may be performed by a request receiving component as described with reference to FIGS. 6 through 8.

At 1135, the application server may transmit a second indication of the page for display by the set of user devices according to the updated page layout. The second indication of the page for display by the user device according to the updated page layout may be transmitted to the user device in response to receiving the second request. The operations of 1135 may be performed according to the methods described herein. In some examples, aspects of the operations of 1135 may be performed by a page indication component as described with reference to FIGS. 6 through 8.

A method for data processing is described. The method may include: storing an initial page layout for a page corresponding to a data object type stored in a database, where the initial page layout is defined by a first user and includes a set of user interface components; transmitting, to a set of user devices operated by a set of users distinct from the first user, a first indication of the page for display by the set of user devices according to the initial page layout; tracking, for the set of user devices, user interactions with the set of user interface components in the initial page layout; determining an updated page layout for the page based on an analysis of the tracked user interactions and the initial page layout, where the updated page layout is different from the initial page layout; and transmitting a second indication of the page for display by the set of user devices according to the updated page layout.

An apparatus for data processing is described. The apparatus may include a processor, memory coupled with the processor, and instructions stored in the memory. The instructions may be executable by the processor to cause the apparatus to: store an initial page layout for a page corresponding to a data object type stored in a database, where the initial page layout is defined by a first user and includes a set of user interface components; transmit, to a set of user devices operated by a set of users distinct from the first user, a first indication of the page for display by the set of user devices according to the initial page layout; track, for the set of user devices, user interactions with the set of user interface components in the initial page layout; determine an updated page layout for the page based on an analysis of the tracked user interactions and the initial page layout, where the updated page layout is different from the initial page layout; and transmit a second indication of the page for display by the set of user devices according to the updated page layout.

Another apparatus for data processing is described. The apparatus may include: means for storing an initial page layout for a page corresponding to a data object type stored in a database, where the initial page layout is defined by a first user and includes a set of user interface components; means for transmitting, to a set of user devices operated by a set of users distinct from the first user, a first indication of the page for display by the set of user devices according to the initial page layout; means for tracking, for the set of user devices, user interactions with the set of user interface components in the initial page layout; means for determining an updated page layout for the page based on an analysis of the tracked user interactions and the initial page layout, where the updated page layout is different from the initial page layout; and means for transmitting a second indication of the page for display by the set of user devices according to the updated page layout.

A non-transitory computer-readable medium storing code for data processing is described. The code may include instructions executable by a processor to: store an initial page layout for a page corresponding to a data object type stored in a database, where the initial page layout is defined by a first user and includes a set of user interface components; transmit, to a set of user devices operated by a set of users distinct from the first user, a first indication of the page for display by the set of user devices according to the initial page layout; track, for the set of user devices, user interactions with the set of user interface components in the initial page layout; determine an updated page layout for the page based on an analysis of the tracked user interactions and the initial page layout, where the updated page layout is different from the initial page layout; and transmit a second indication of the page for display by the set of user devices according to the updated page layout.

Some examples of the method, apparatuses, and non-transitory computer-readable medium described herein may further include operations, features, means, or instructions for: transmitting, to a second set of user devices operated by a second set of users different from the set of users, a third indication of the page for display by the second set of user devices according to the initial page layout, where tracking the user interactions includes tracking, for the set of user devices and the second set of user devices, the user interactions with the set of user interface components in the initial page layout; determining a second updated page layout for the page based on the analysis of the tracked user interactions and the initial page layout, where the second updated page layout may be associated with the second set of user devices and may be different from the initial page layout and the updated page layout; and transmitting a fourth indication of the page for display by the second set of user devices according to the second updated page layout.

Some examples of the method, apparatuses, and non-transitory computer-readable medium described herein may further include operations, features, means, or instructions for receiving a first request from a user device of the set of user devices to view a data object of the data object type stored in the database, where the first indication of the page for display by the user device according to the initial page layout may be transmitted to the user device in response to receiving the first request, and receiving a second request from the user device of the set of user devices to view the data object of the data object type stored in the database, where the second indication of the page for display by the user device according to the updated page layout may be transmitted to the user device in response to receiving the second request.

Some examples of the method, apparatuses, and non-transitory computer-readable medium described herein may further include operations, features, means, or instructions for receiving a user input from the first user indicating the updated page layout and storing the updated page layout for the page corresponding to the data object type stored in the database, where the updated page layout replaces the initial page layout as a baseline page layout for the page based on the user input from the first user.

Some examples of the method, apparatuses, and non-transitory computer-readable medium described herein may further include operations, features, means, or instructions for tracking, for the set of user devices, additional user interactions with the set of user interface components in the updated page layout and determining a further updated page layout for the page based on an analysis of the tracked additional user interactions and the updated page layout, where the further updated page layout may be different from the updated page layout.

Some examples of the method, apparatuses, and non-transitory computer-readable medium described herein may further include operations, features, means, or instructions for receiving a user input accepting the updated page layout from a user of the set of users, the first user, or a combination thereof, where the second indication of the page for display by the set of user devices according to the updated page layout may be transmitted based on the user input.

Some examples of the method, apparatuses, and non-transitory computer-readable medium described herein may further include operations, features, means, or instructions for automatically updating the initial page layout with the updated page layout for the page based on determining the updated page layout, a trigger condition, an update schedule, or a combination thereof, where the second indication of the page for display by the set of user devices according to the updated page layout may be transmitted based on the automatic updating.

In some examples of the method, apparatuses, and non-transitory computer-readable medium described herein, the updated page layout may include an updated set of user interface components and the method, apparatuses, and non-transitory computer-readable medium described herein may further include operations, features, means, or instructions for transmitting, to a user device of the set of user devices, a data value for the first indication of the page for display by the user device according to the initial page layout based on a user interface component of the set of user interface components including the data value and refraining from transmitting, to the user device, the data value for the second indication of the page for display by the user device according to the updated page layout based on the updated set of user interface components not including the data value.

In some examples of the method, apparatuses, and non-transitory computer-readable medium described herein, determining the updated page layout for the page further may include operations, features, means, or instructions for inputting the tracked user interactions, the initial page layout, or a combination thereof into a machine learning model, where the machine learning model outputs an indication of the updated page layout.

In some examples of the method, apparatuses, and non-transitory computer-readable medium described herein, determining the updated page layout for the page further may include operations, features, means, or instructions for performing a statistical analysis on the tracked user interactions, the initial page layout, or a combination thereof, where the updated page layout may be determined based on the statistical analysis.

In some examples of the method, apparatuses, and non-transitory computer-readable medium described herein, the updated page layout includes an updated set of user interface components, and the updated set of user interface components may be different from the set of user interface components, positioning of the updated set of user interface components may be different from positioning of the set of user interface components, display icons for the updated set of user interface components may be different from display icons for the set of user interface components, an order for rendering the updated set of user interface components may be different from an order for rendering the set of user interface components, or a combination thereof.

In some examples of the method, apparatuses, and non-transitory computer-readable medium described herein, tracking the user interactions further may include operations, features, means, or instructions for storing, for each user click in a user interface displaying the initial page layout, a user performing the user click, a user interface component clicked on by the user click, a timestamp for the user click, a timestamp for accessing the page, a next page accessed by the user based on the user click, a timestamp for accessing the next page, a task associated with the user click, or a combination thereof.

In some examples of the method, apparatuses, and non-transitory computer-readable medium described herein, the updated page layout for the page may be determined based on a number of clicks for each user interface component of the set of user interface components, a number of page reloads for the page, an amount of time accessing the page, an amount of time between accessing the page and a user click on the page, an amount of time for completing a task associated with the page, or a combination thereof.

In some examples of the method, apparatuses, and non-transitory computer-readable medium described herein, the first user may be authorized to define a page layout for the page, and at least one user of the set of users may be unauthorized to define the page layout for the page.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. In a non-limiting example, a processor may include a CPU, a GPU, a graphics card, a tensor processing unit (TPU), or the like. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   storing an initial page layout for a page corresponding to a data object type stored in a database, wherein the initial page layout is defined by a first user, comprises a set of user interface components, and is identifiable by a page layout identifier key that identifies the corresponding data object type that is stored in the database;
   transmitting, to a plurality of user devices operated by a plurality of users distinct from the first user, a first indication of the page for display by the plurality of user devices according to the initial page layout;
   tracking, for the plurality of user devices, user interactions with the set of user interface components in the initial page layout;
   determining an updated page layout for the page based at least in part on the page layout identifier key and an analysis of the tracked user interactions and the initial page layout, wherein the updated page layout is different from the initial page layout; and
   transmitting a second indication of the page for display by the plurality of user devices according to the updated page layout.

2. The method of claim 1, further comprising:
   transmitting, to a second plurality of user devices operated by a second plurality of users different from the plurality of users, a third indication of the page for display by the second plurality of user devices according to the initial page layout, wherein tracking the user interactions comprises tracking, for the plurality of user devices and the second plurality of user devices, the user interactions with the set of user interface components in the initial page layout;
   determining a second updated page layout for the page based at least in part on the analysis of the tracked user interactions and the initial page layout, wherein the second updated page layout is associated with the second plurality of user devices and is different from the initial page layout and the updated page layout; and
   transmitting a fourth indication of the page for display by the second plurality of user devices according to the second updated page layout.

3. The method of claim 1, further comprising:
   receiving a first request from a user device of the plurality of user devices to view a data object of the data object type stored in the database, wherein the first indication of the page for display by the user device according to the initial page layout is transmitted to the user device in response to receiving the first request; and
   receiving a second request from the user device of the plurality of user devices to view the data object of the data object type stored in the database, wherein the second indication of the page for display by the user device according to the updated page layout is transmitted to the user device in response to receiving the second request.

4. The method of claim 1, further comprising:
   receiving a user input from the first user indicating the updated page layout; and
   storing the updated page layout for the page corresponding to the data object type stored in the database, wherein the updated page layout replaces the initial page layout as a baseline page layout for the page based at least in part on the user input from the first user.

5. The method of claim 4, further comprising:
   tracking, for the plurality of user devices, additional user interactions with the set of user interface components in the updated page layout; and
   determining a further updated page layout for the page based at least in part on an analysis of the tracked additional user interactions and the updated page layout, wherein the further updated page layout is different from the updated page layout.

6. The method of claim 1, further comprising:
   receiving a user input accepting the updated page layout from a user of the plurality of users, the first user, or a combination thereof, wherein the second indication of the page for display by the plurality of user devices according to the updated page layout is transmitted based at least in part on the user input.

7. The method of claim 1, further comprising:
   automatically updating the initial page layout with the updated page layout for the page based at least in part on determining the updated page layout, a trigger condition, an update schedule, or a combination thereof, wherein the second indication of the page for display by the plurality of user devices according to the updated page layout is transmitted based at least in part on the automatic updating.

8. The method of claim 1, wherein the updated page layout comprises an updated set of user interface components, the method further comprising:

transmitting, to a user device of the plurality of user devices, a data value for the first indication of the page for display by the user device according to the initial page layout based at least in part on a user interface component of the set of user interface components comprising the data value; and refraining from transmitting, to the user device, the data value for the second indication of the page for display by the user device according to the updated page layout based at least in part on the updated set of user interface components not comprising the data value.

9. The method of claim 1, wherein determining the updated page layout for the page further comprises:

inputting the tracked user interactions, the initial page layout, or a combination thereof into a machine learning model, wherein the machine learning model outputs an indication of the updated page layout.

10. The method of claim 1, wherein determining the updated page layout for the page further comprises:

performing a statistical analysis on the tracked user interactions, the initial page layout, or a combination thereof, wherein the updated page layout is determined based at least in part on the statistical analysis.

11. The method of claim 1, wherein:

the updated page layout comprises an updated set of user interface components; and the updated set of user interface components is different from the set of user interface components, positioning of the updated set of user interface components is different from positioning of the set of user interface components, display icons for the updated set of user interface components are different from display icons for the set of user interface components, an order for rendering the updated set of user interface components is different from an order for rendering the set of user interface components, or a combination thereof.

12. The method of claim 1, wherein tracking the user interactions further comprises:

storing, for each user click in a user interface displaying the initial page layout, a user performing the user click, a user interface component clicked on by the user click, a timestamp for the user click, a timestamp for accessing the page, a next page accessed by the user based at least in part on the user click, a timestamp for accessing the next page, a task associated with the user click, or a combination thereof.

13. The method of claim 1, wherein the updated page layout for the page is determined based at least in part on a number of clicks for each user interface component of the set of user interface components, a number of page reloads for the page, an amount of time accessing the page, an amount of time between accessing the page and a user click on the page, an amount of time for completing a task associated with the page, or a combination thereof.

14. The method of claim 1, wherein:

the first user is authorized to define a page layout for the page; and at least one user of the plurality of users is unauthorized to define the page layout for the page.

15. An apparatus for data processing, comprising: a processor; memory coupled with the processor; and instructions stored in the memory and executable by the processor to cause the apparatus to:

store an initial page layout for a page corresponding to a data object type stored in a database, wherein the initial page layout is defined by a first user, comprises a set of user interface components, and is identifiable by a page layout identifier key that identifies the corresponding data object type that is stored in the database;

transmit, to a plurality of user devices operated by a plurality of users distinct from the first user, a first indication of the page for display by the plurality of user devices according to the initial page layout;

track, for the plurality of user devices, user interactions with the set of user interface components in the initial page layout;

determine an updated page layout for the page based at least in part on the page layout identifier key and an analysis of the tracked user interactions and the initial page layout, wherein the updated page layout is different from the initial page layout; and transmit a second indication of the page for display by the plurality of user devices according to the updated page layout.

16. The apparatus of claim 15, wherein the instructions are further executable by the processor to cause the apparatus to:

transmit, to a second plurality of user devices operated by a second plurality of users different from the plurality of users, a third indication of the page for display by the second plurality of user devices according to the initial page layout, wherein tracking the user interactions comprises tracking, for the plurality of user devices and the second plurality of user devices, the user interactions with the set of user interface components in the initial page layout;

determine a second updated page layout for the page based at least in part on the analysis of the tracked user interactions and the initial page layout, wherein the second updated page layout is associated with the second plurality of user devices and is different from the initial page layout and the updated page layout; and transmit a fourth indication of the page for display by the second plurality of user devices according to the second updated page layout.

17. The apparatus of claim 15, wherein the instructions are further executable by the processor to cause the apparatus to:

receive a first request from a user device of the plurality of user devices to view a data object of the data object type stored in the database, wherein the first indication of the page for display by the user device according to the initial page layout is transmitted to the user device in response to receiving the first request; and receive a second request from the user device of the plurality of user devices to view the data object of the data object type stored in the database, wherein the second indication of the page for display by the user device according to the updated page layout is transmitted to the user device in response to receiving the second request.

18. A non-transitory computer-readable medium storing code for data processing, the code comprising instructions executable by a processor to:

store an initial page layout for a page corresponding to a data object type stored in a database, wherein the initial page layout is defined by a first user, comprises a set of user interface components, and is identifiable by a page layout identifier key that identifies the corresponding data object type that is stored in the database;

transmit, to a plurality of user devices operated by a plurality of users distinct from the first user, a first indication of the page for display by the plurality of user devices according to the initial page layout;

track, for the plurality of user devices, user interactions with the set of user interface components in the initial page layout;

determine an updated page layout for the page based at least in part on the page layout identifier key and an analysis of the tracked user interactions and the initial page layout, wherein the updated page layout is different from the initial page layout; and transmit a second indication of the page for display by the plurality of user devices according to the updated page layout.

19. The non-transitory computer-readable medium of claim 18, wherein the instructions are further executable to:

transmit, to a second plurality of user devices operated by a second plurality of users different from the plurality of users, a third indication of the page for display by the second plurality of user devices according to the initial page layout, wherein tracking the user interactions comprises tracking, for the plurality of user devices and the second plurality of user devices, the user interactions with the set of user interface components in the initial page layout;

determine a second updated page layout for the page based at least in part on the analysis of the tracked user interactions and the initial page layout, wherein the second updated page layout is associated with the second plurality of user devices and is different from the initial page layout and the updated page layout; and transmit a fourth indication of the page for display by the second plurality of user devices according to the second updated page layout.

20. The non-transitory computer-readable medium of claim 18, wherein the instructions are further executable to:

receive a first request from a user device of the plurality of user devices to view a data object of the data object type stored in the database, wherein the first indication of the page for display by the user device according to the initial page layout is transmitted to the user device in response to receiving the first request; and receive a second request from the user device of the plurality of user devices to view the data object of the data object type stored in the database, wherein the second indication of the page for display by the user device according to the updated page layout is transmitted to the user device in response to receiving the second request.

* * * * *